Dec. 14, 1954   R. W. JUSTICE   2,696,730
APPARATUS FOR TESTING PISTON PACKINGS AND THE LIKE
Filed Nov. 8, 1950   2 Sheets-Sheet 1

INVENTOR
RAYMOND W. JUSTICE

BY *Francis J. Klempay*
ATTORNEY

United States Patent Office 2,696,730
Patented Dec. 14, 1954

2,696,730

APPARATUS FOR TESTING PISTON PACKINGS AND THE LIKE

Raymond W. Justice, Philadelphia, Pa.

Application November 8, 1950, Serial No. 194,711

2 Claims. (Cl. 73—9)

This invention relates to apparatus for testing piston packings and the like, and more particularly to a novel device for making various qualitative and quantitative determinations of the operational characteristics of fluid-tight packings such as might be used for hydraulic pistons for example.

In determining the effectiveness of various types of piston packings it is desirable to know not only the ability of the packing to withstand the applied fluid pressures, but also such pertinent characteristics as, for instance, static and dynamic friction under various applied pressures, endurance and wearing qualities at various pressures, and leakage under both static and dynamic conditions and varied pressures.

It is accordingly the primary object of this invention to provide a practical apparatus which is operative to give an accurate indication of these various packing characteristics under conditions of varied piston velocities and fluid pressures.

A further object of this invention is the provision of a testing machine of the character described which is neat in appearance, compact and portable so as to render it suitable for laboratory use and for demonstative purposes.

A still further object of my invention is the provision of an improved apparatus for testing piston packings and the like whereby characteristic factors other than those desired for any particular determination may be eliminated or completely isolated to insure accurate results.

Another object of this invention is the provision of improved control whereby a testing machine of the kind involved may be operated automatically, as might be desired for extensive laboratory tests, or manually as might be desired for demonstrative purposes.

Other objects and advantages of the invention will become apparent upon full consideration of the following specification and accompanying drawings wherein there is disclosed a certain preferred embodiment of the invention.

Figure 3:
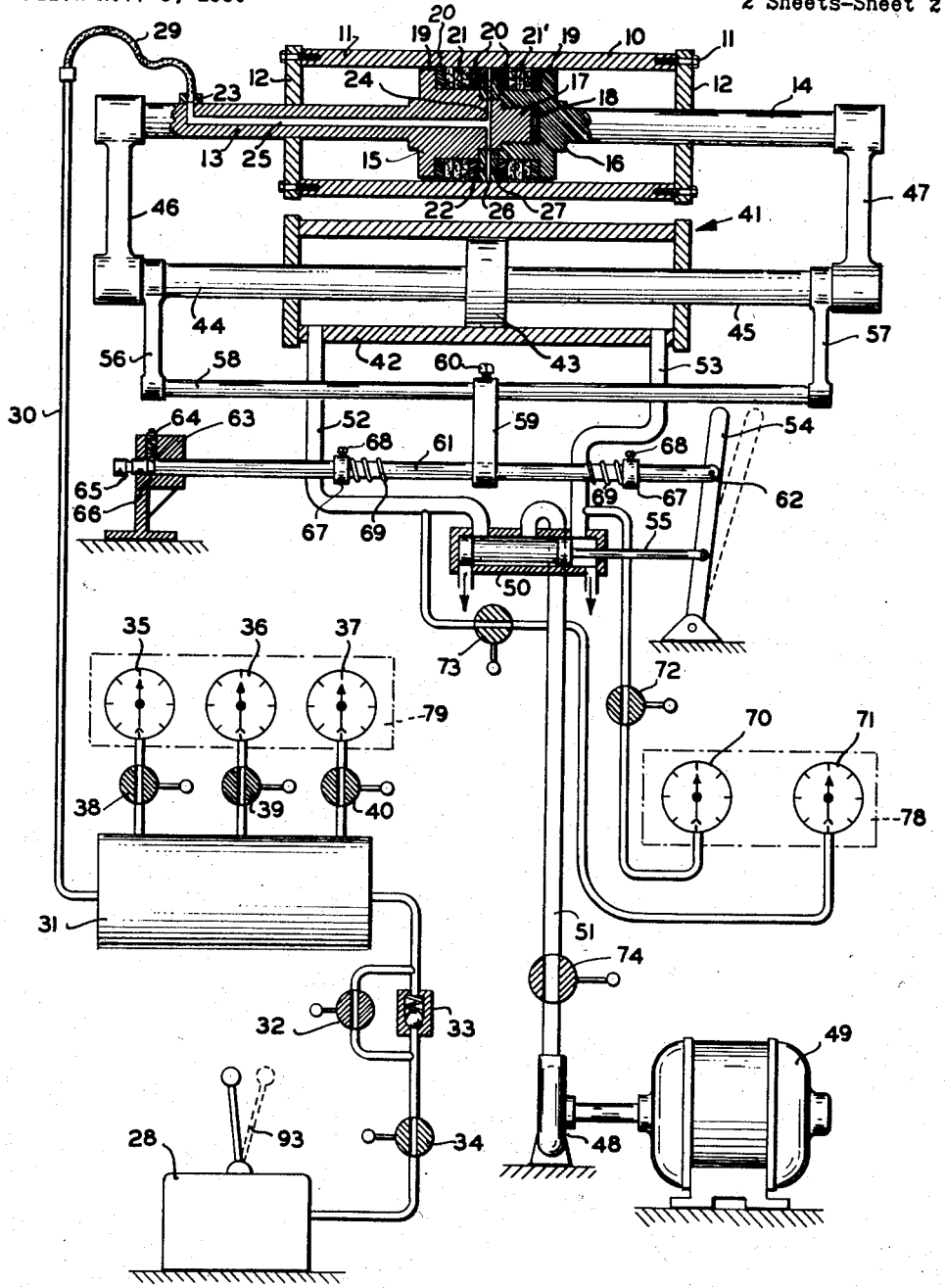
Figure 3 is a sectional view of the principal operative elements of the apparatus of Figure 1 with the hydraulic circuit shown in schematic form.

Referring to the drawings and in particular to Figure 3, which depicts my invention from an operative standpoint, it will be noted that in general I have provided a test unit having suitable indicating devices and which is motivated by an independent hydraulic system.

My test unit includes an elongated cylinder 10 which is internally honed to a smoothness substantially equaling that of a standard commercial hydraulic cylinder. Circumferentially spaced threaded holes are provided at each end of the cylinder 10 to receive cap-retaining bolts 11, which rigidly secure end caps 12. End caps 12 are, of course, apertured centrally to slidably receive piston rods 13 and 14. At the inner ends of the piston rods 13 and 14 I have provided, integrally therewith, pistons 15 and 16. In the embodiment shown piston 15 has an axially extending threaded boss 17 which is received in a mating threaded bore 18 provided in piston 16. Both pistons 15 and 16 are flanged at their outer ends to provide packing retaining shoulders 19.

The packing assembly herein described includes a pair of axially spaced rings or collars 20 of a rigid material as, for example, bronze. Positioned between rings 20 are rings 21 or 21' of suitable packing material such as, for example, leather. A packing assembly 21—20 or 21'—20 is positioned on each of pistons 15 and 16 and a spacer ring 22 is placed between the two assemblies so that, in effect, two independent piston assemblies are formed. To conduct fluid pressure to the packing assemblies I have provided an axial bore 25 extending partially throughout the length of piston rod 13. A radial bore 23 intersects the axial bore 25 at a point along the piston rod 13 which lies outside the point of its farthest inward travel and a series of radial bores 24 intersect bore 25 near its inner end and terminate at the inner wall of the spacer ring 22. Said spacer ring 22 is provided with an annular groove around its inner wall which connects bores 24 with a series of bores 26 which extend radially throughout the ring 22. A longitudinal bore 27 intersects each radial bore 26 and extends through the spacer ring 22. It should be apparent that any fluid pressure applied at 23 will be transmitted through the passage 23—25—24—26—27 to apply pressure at the packing assemblies in much the same manner as under actual operating conditions.

To apply fluid pressure at 23 I have provided a flexible tube 29 which is connected to a supply conduit 30. An expansion tank 31 is placed in the supply line so that any leakage around or through the packing assemblies 21—20 or 21'—20 will cause only a slight volume differential and therefore will cause little variation in pressure. A combined hand pump and storage reservoir 28 of a standard commercial variety is connected to the supply conduit 30 through the tank 31. In accord with usual practice a by-pass valve 32 and ball check 33 are placed between the pump 28 and the tank 31 to control the application and release of the pressure. A master control valve 34 may also be provided between the pump 28 and check valve 33 to eliminate any errors due to fluid seepage through the check valve 33.

In the embodiment shown I have provided a panel (shown in phantom outline) of three pressure gauges 35, 36, and 37 connected to the expansion tank 31 and controlled by valves 38, 39, and 40 respectively. Each of the gauges 35, 36, and 37 has a different pressure range as, for example, 0–500, 0–1000, and 0–5000 pounds per square inch. By using this arrangement tests may be made in the high pressure range as well as the low pressure range with substantially equal accuracy in the reading of each gauge.

For the purpose of imparting a reciprocating motion to the pistons 15 and 16 of the test unit I have provided a hydraulic actuator 41 comprising a cylinder 42 and a double acting piston 43 which has piston rods 44 and 45 extending outwardly from each of its ends. Cylinders 10 and 42, of course, have their axes in spaced parallel relationship so that when the piston rods 13 and 44 are rigidly connected by an upwardly extending driving arm 46 and piston rods 14 and 45 are similarly connected by arm 47 any motion of the piston 43 of the actuator 41 will be imparted to the pistons 15 and 16 of the test unit. Driving arms 46 and 47 are readily disconnectable from rods 13, 14, 44, and 45 for reasons to be hereinafter explained.

To supply motivating power to the actuator 41 a hydraulic pump 48, driven by an electric motor 49 or other suitable power device, is connected to a four-way valve 50 by means of a supply conduit 51. Conduits 52 and 53 connect each end of the actuating cylinder 42 with the outlet connections of the four-way valve 50, the connection being such that one end of the cylinder 42 is exhausting while pressure is being applied to the other end.

For operating the four-way valve 50 I have provided a hand lever 54 which is connected to the valve piston by means of rod 55. For manual operation the hand lever 54 is shifted to cause a reversal of liquid flow. For automatic operation I have provided a pair of depending arms 56 and 57 one of which extends from near the outer end of each of the actuator piston rods 44 and 45 and which support at their lower ends a longitudinal rod 58. A longitudinally adjustable trip arm 59 depends from the rod 58. The trip arm 59 may be secured in any longitudinal position by means of the set screw 60 which may be brought to bear on rod 58. A control rod 61 extends through a suitable aperture in the trip arm 59 and is rotatably secured at one end to the hand lever 54 by a pin 62 and slidably received at its other end in a journal post 63. A spring-ball detent 64 is provided in the journal post 63 to engage one or the other of a pair of spaced annular grooves 65 and 66 which are provided to retain the control rod 61 at positions corresponding to the "forward" and "reverse" positions of the valve 50. Adjustable collars 67 are placed around the control rod 61 and are spaced from each side of the trip arm 59. After adjustment, collars 67 are retained by tightening set screws 68. To insure proper actuation of the control rod 61 compressible coil springs 69 are placed over the rod 61 and between the trip arm 59 and each collar 67. It should be apparent that as the actuating piston 43 nears the end of a stroke the trip arm 59 will move along the control rod 61 until contact is made with one of the springs 69. Upon this contact, and as the trip arm continues its travel, the coil spring 69 will compress until sufficient force is stored in the spring to dislodge the control rod 61 from the spring-ball detent 64, whereupon the rod 61 is quickly shifted to the second detent position, thereby shifting the four-way valve, causing the actuating piston 43 to travel in the reverse direction.

Inasmuch as the force required to move the assembly will be the product of the area of the actuating piston and the pressure of the fluid acting thereupon, I have provided a second panel 78 (also shown in phantom outline) of gauges 70 and 71, connected to conduits 53 and 52 respectively and controlled by valves 72 and 73. Since the area of piston 43 is both known and constant any value of fluid pressure at the cylinder ends may be transformed directly into units of force, and, if desired, gauges 70 and 71 may be calibrated to so read. Also, in accordance with usual practice, I have provided a master control valve 74 between the pump 48 and four-way valve 50 which may be used to vary the speed of the actuating piston 43.

Figure 1:
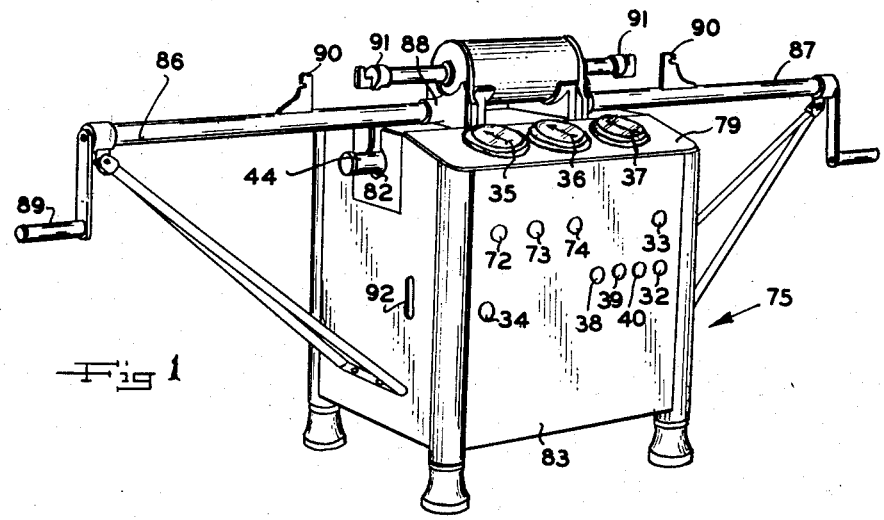
Figure 1 is a perspective view of a testing machine constructed according to the principles of my invention, showing the apparatus as set up for use with a dynamometer.
Figure 2:
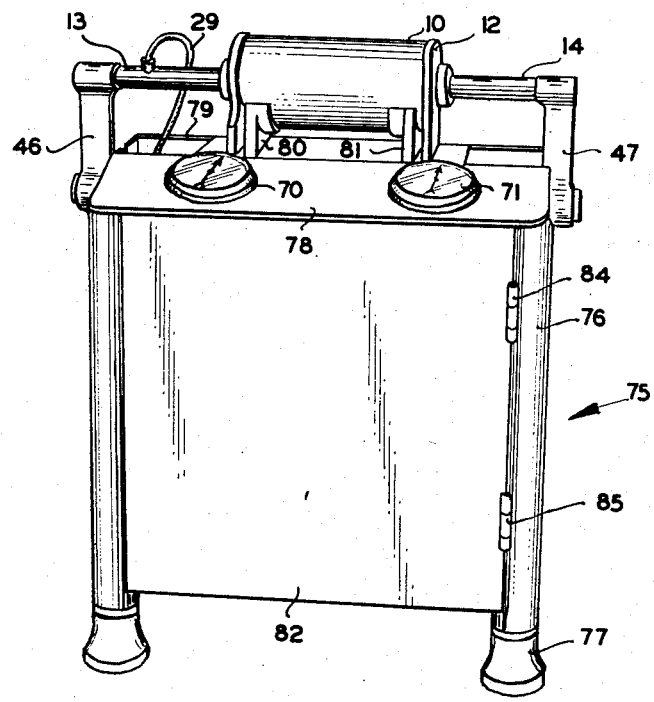
Figure 2 is a perspective view of the apparatus of Figure 1 showing it as set up for automatic operation.

Referring now to Figures 1 and 2 wherein the assembled form of the apparatus is described, the reference numeral 75 denotes a box-shaped cabinet which contains the actuating mechanism and controls. Legs 76, of metal tubing are secured at each of the vertical corners of the cabinet 75 and feet 77 are secured at the bottom of each leg 76. To improve portability the feet 77 are adapted to receive castors, not shown. Gauge panels 78 and 79 are secured to the open top of the cabinet 75 and extend partially to its center. Through the central portion of the open area between gauge panels 78 and 79 extend mounting brackets 80 and 81 upon which the test cylinder 10 is secured. Slots 82 are provided at each end of the cabinet to permit motion of the actuating piston rods 44 and 45 and the attached driving arms 46 and 47. The pressure gauges 35, 36, 37, 70 and 71 are, of course, mounted on panels 78 and 79 in the manner shown in Figure 3. Flush with the front side 83 of the cabinet are the control valves for my apparatus. I have provided that these valves be flush and require a removable socket wrench for actuation to prevent unauthorized tampering with the controls during tests as well as reduce the possibility of damage during shipment. The back side 82 of the cabinet is hinged at 84 and 85 to provide access to the mechanism for necessary adjustments and repairs.

In reference to Figure 1 I have provided a pair of removable arms 86 and 87 of tubular construction which extend from brackets 88 which are secured to the end caps 12 of the test cylinder 10 and which are adapted to slidably receive the inner ends of said extending arms. Suitable braces as shown extend from the outer ends of arms 86 and 87 to the lower portion of the ends of the cabinets. An elongated threaded rod, not shown, is positioned inside each of the tubular arms 86 and 87 and threadedly engages therein an upwardly extending jack-hook 90 which travels along a longitudinal slot provided in the wall of the tubing. A crank 89 is attached to the outer end of each threaded rod, not shown, to provide means of imparting rotation thereto to thereby cause the jack-hook 90 to travel along its guiding slot. Before inserting the tubular arms 86 and 87 into their retaining brackets it is of course necessary to first remove the driving arms 46 and 47. A hook attachment 91 is secured at the outer end of piston rods 13 and 14 and is adapted to oppose the aforementioned jack-hook 90 so that a dynamometer, not shown may be connected therebetween. Any force indicating instrument will suffice for use as a dynamometer in this case. Reference is made to my co-pending application Serial No. 121,187, filed October 13, 1949, now U. S. Patent No. 2,611,263, which shows in more detail the construction of the jack arms 86 and 87 and the connection of the dynamometer thereto.

To operate my apparatus the driving arms 46 and 47 and the end caps 12 are removed to allow pistons 15 and 16 to be disassembled. The packing 21 and 21' to be tested is placed over the ends of the disassembled pistons 15 and 16 between the rigid rings 20. The pistons are then reassembled with the perforate spacer rings 22 in position. It is to be understood that only the packing 21 and 21' has contact with the inner wall of the cylinder 10, rings 20 and 22 being sufficiently relieved to provide a slight clearance.

With the replacement of end caps 12 and the insertion of the tubular arms 86 and 87 the apparatus is ready for the dynamometer test. For this test fluid pressure is first applied to the packing assemblies by the hand pump 28, the lever 93 of which extends through an elongated aperture 92 provided in the end wall of the cabinet 75. The proper pressure having been attained, as indicated by one or more of gauges 35, 36 and 37, the dynamometer, not shown, is connected between hooks 90 and 91. As crank 89 is then rotated to draw hook 90 outwardly, the force required to move the pistons 15 and 16, or more precisely the frictional force between the walls of cylinder 10 and the packing 21 and 21' is registered by the dynamometer. This test should be made from both directions to obtain valid results.

It should be understood, however, that, generally, the frictional forces of packing are not equal in both directions. I, therefore, contemplate using a standard packing of known and proven characteristics for one assembly, as for instance 21 and 20, and a packing of unknown characteristics for the second assembly, as for instance 21' and 20. By using a standard packing of known characteristics it is necessary to merely subtract the known frictional force from the dynamometer reading to obtain that of the packing in question.

If, however, no suitable standard packing is available, a standard may be calibrated by obtaining two sets of each of two dissimilar packings and performing a dynamometer test on each of the three possible combinations. An elementary simultaneous solution will then provide two calibrated standard packings.

Having completed the dynamometer test, the tubular arms 86 and 87 are removed and driving arms 46 and 47 are attached to connect the actuating element to the test unit. Reciprocating motion of the test pistons 15 and 16 is achieved by opening valve 74 and starting the motor 49. As explained previously, pressure gauges 70 and 71 will indicate the force necessary to drive the actuator 41. This force comprises two factors, namely: the force necessary to drive the test pistons 15 and 16, and the force necessary to drive the actuator piston 43 alone. The second factor is, of course, easily isolated and determined. The total force indicated by gauges 70 and 71 minus the force necessary to drive the actuator piston 43 should therefore agree with the results indicated by the dynamometer test for very slow speeds.

It is important to note that the fluid pressure applied to the packing is in no way affected by the motion of the test pistons 15 and 16, provided, of course, that the packing is not worn to the point of excessive leakage.

By the use of the apparatus of the invention it is therefore possible, primarily through comparative tests, to determine both the static and dynamic friction of various types of piston and rod packings. During operational tests of the packings under various speeds as determined by the setting of the valve 74, for example, the fluid pressure applied to the packing may be varied as desired and determined from the gauge panel 79, and the force necessary to move the piston and/or rod which is packed with the test material may be determined from the gauge panel 78 as explained above. Therefore, the apparatus of the invention provides a compact and remarkably effective assembly for determining all the critical characteristics of piston and rod packings. This includes, of course, tests for breakdown pressures, maximum life, and degree of wear with resultant increase in leakage in relation to longevity and pressure factors. The automatic reversing or recycling arrangement readily enables these life tests to be conducted.

It should now be apparent that I have provided an apparatus which accomplishes the objects initially set forth. My apparatus is practical, compact and operative to perform almost any test demanded of packing material. It should be observed, also, that by removing the packing assemblies and providing suitable end caps for the test cylinder, my apparatus is rendered operative for testing rod packings in the same manner as it is used for testing piston packing.

The herein specifically described embodiment should be considered as illustrative only as numerous variations in structure may be made without departing from the true spirit or scope of the invention. Reference should therefore be had to the appended claims in determining the scope of the invention.

I claim:

1. In apparatus for determining performance characteristics of piston type packing and the like the combination of a casing having an upper wall, a horizontally disposed test cylinder supported on said upper wall and having readily removable end caps, a piston adapted to receive and retain packing to be tested slidably received in said cylinder and having a rod connected thereto and extending outwardly through each end cap, a horizontally disposed driving cylinder mounted in said casing below said top wall and having a piston rod extending outwardly from either end parallel with the first mentioned piston rods, means in said casing to apply fluid pressure to opposite ends of said driving cylinder, and detachable links interconnecting the adjacent outer ends of said first and second mentioned piston rods whereby the piston in said test cylinder may be reciprocated upon the alternate application of fluid pressure to the opposite ends of said driving cylinder.

2. In apparatus for determining performance characteristics of piston-type packings and the like the combination of a fixed test cylinder, a pair of rigidly interconnected and longitudinally spaced pistons in said cylinder, means on one of said pistons to receive a piston-type packing to be tested, piston rods extending outwardly of each axial end of said interconnected pistons, a fluid cylinder positioned transversely adjacent said test cylinder and having a reciprocating piston and outwardly extending piston rods, rigid detachable links connecting said last mentioned piston rods with said first mentioned piston rods, and means to apply fluid pressure to said packing.

References Cited in the file of this patent

UNITED STATES PATENTS

| Number | Name | Date |
|---|---|---|
| 831,603 | Davis | Sept. 25, 1906 |
| 1,068,243 | Iversen | July 22, 1913 |
| 1,137,821 | White | May 4, 1915 |
| 2,038,092 | Wheeler | Apr. 21, 1936 |
| 2,081,404 | Marx | May 25, 1937 |
| 2,539,018 | Hardy | Jan. 23, 1951 |

FOREIGN PATENTS

| Number | Country | Date |
|---|---|---|
| 487,335 | Great Britain | June 20, 1938 |
| 892,712 | France | May 17, 1944 |